US006964372B1

(12) United States Patent
Peterson

(10) Patent No.: US 6,964,372 B1
(45) Date of Patent: Nov. 15, 2005

(54) CONFERENCE-TABLE-BASED WIRED INFORMATION SYSTEM

(76) Inventor: William M. Peterson, 5812 W. Ivanhoe St., Chandler, AZ (US) 85226

(*) Notice: Subject to any disclaimer, the term of this patent is extended or adjusted under 35 U.S.C. 154(b) by 0 days.

(21) Appl. No.: 10/629,274

(22) Filed: Jul. 29, 2003

Related U.S. Application Data

(60) Provisional application No. 60/403,044, filed on Aug. 13, 2002.

(51) Int. Cl.[7] .............................................. G06F 17/60
(52) U.S. Cl. .......................... 235/386; 235/51; 235/56; 235/57; 705/12; 434/322; 434/336; 434/350
(58) Field of Search ............................... 235/51, 50 B, 235/54 A, 54 C, 54 F, 56, 386, 57; 434/306, 434/350, 336, 327, 322, 353, 359, 362; 370/346, 370/449; 725/13, 16, 9, 24; 340/3.51; 705/12; 379/92

(56) References Cited

U.S. PATENT DOCUMENTS

| | | | | | |
|---|---|---|---|---|---|
| 2,712,976 | A | | 7/1955 | Blaustein et al. | |
| 2,878,996 | A | | 3/1959 | Millard | |
| 3,190,014 | A | | 6/1965 | Rhodes | |
| 3,318,517 | A | | 5/1967 | Wells | |
| 3,319,254 | A | | 5/1967 | Rice | |
| 3,378,194 | A | | 4/1968 | Wells | |
| 3,744,712 | A | | 7/1973 | Papadopoulos et al. | |
| 3,766,541 | A | | 10/1973 | Gordon | |
| 3,776,453 | A | | 12/1973 | Friedman | |
| 3,790,073 | A | * | 2/1974 | Martin et al. | 235/54 F |
| 3,947,669 | A | * | 3/1976 | Simmons et al. | 705/12 |
| 4,004,354 | A | * | 1/1977 | Yamauchi | 434/336 |
| 4,062,615 | A | * | 12/1977 | Navarro | 439/400 |
| 4,084,081 | A | * | 4/1978 | Raheb | 235/52 |
| 4,377,870 | A | * | 3/1983 | Anderson et al. | 725/24 |
| 4,510,378 | A | * | 4/1985 | Dolson | 235/50 R |
| 4,764,120 | A | * | 8/1988 | Griffin et al. | 434/336 |
| D302,424 | S | * | 7/1989 | Solon et al. | D14/399 |
| D310,069 | S | | 8/1990 | Leone | |
| 5,226,177 | A | * | 7/1993 | Nickerson | 725/24 |
| 5,724,357 | A | | 3/1998 | Derks | |
| 6,628,918 | B2 | * | 9/2003 | Roschelle et al. | 434/350 |
| 2002/0106620 | A1 | * | 8/2002 | Barnum | 434/306 |
| 2003/0055719 | A1 | * | 3/2003 | Faigle | 705/12 |
| 2003/0088452 | A1 | * | 5/2003 | Kelly | 705/10 |
| 2003/0137986 | A1 | * | 7/2003 | Kaku et al. | 370/449 |
| 2005/0043988 | A1 | * | 2/2005 | Illsley et al. | 705/12 |

* cited by examiner

*Primary Examiner*—Karl D. Frech
*Assistant Examiner*—Daniel Walsh
(74) *Attorney, Agent, or Firm*—Parsons & Goltry; Robert A. Parsons; Michael W. Goltry

(57) ABSTRACT

A table-based wired information system includes a table having a plurality of actual positions designed to receive people and a monitor positioned so as to be observed by people at any of the plurality of actual positions. A flat ribbon cable with a plurality of electrical conductors less than the number of available positions is affixed to an under-surface of the table in a flat orientation by an adhesive backing. A plurality of vote boxes, each including a multi-position switch, are adhesively attached to the under-surface at each of the actual positions. The cable is coupled to the monitor system and each of the vote boxes is coupled to the cable intermediate the ends by a press-on insulation displacement connector.

27 Claims, 11 Drawing Sheets

CONFERENCE-TABLE-BASED WIRED INFORMATION SYSTEM

CROSS-REFERENCED TO RELATED APPLICATION

This application claims the benefit of U.S. Provisional Application No. 60/403,044, filed 13 Aug. 2002.

FIELD OF THE INVENTION

The present invention relates to a method and apparatus for efficiently converting an ordinary conference table into an easy to use multipurpose information distribution and processing system.

BACKGROUND OF THE INVENTION

In today's fast moving and complex world, most non-trivial projects require the varied expertise and simultaneous efforts from multiple individual people. Often, small teams are involved; many are limited to a dozen, or fewer people. (Evidence: The vast majority of corporate conference room tables seat fewer than 12 people). Collectively, these teams determine the fates of billion-dollar-programs, as well as the fates of many corporations, themselves.

Yet, it is common knowledge, among experienced meeting attendees, that groups and teams face a variety of potential communication breakdowns. Some examples are, 'incomplete sharing of critical facts', 'important clarification that goes unsought' and 'questionable logic that goes unchallenged'. Clearly, sincere and complete discussion is needed to avoid such breakdowns. Very often, sincere and complete discussion can be initiated as follows: Ask a tough question, allow the attendees to answer it anonymously, and display the vote tally (but not any individual votes). Often, group members will anonymously flag a problem that they would not flag without anonymity. Yet, when they see that others in the group share their same concern, open (sincere and complete) discussion follows. In summary, a typical sequence is, "ask tough question #1, display the anonymous tally, engage in 'somewhat open' discussion, ask tough question #2, display the anonymous tally, engage in even more open discussion". This anonymous-polling-sequence can be used numerous times in a single meeting. However, it must be fast, convenient, easy to learn, and easy to use.

An unmet need exists for truly practical conference-table-based polling systems. This is evidenced by today's lack of any kind of instant polling capability in millions of corporate conference rooms, where numerous important face-to-face meetings take place, daily. This is further evidenced by the complete global absence of any truly practical conference-table-mounted polling capability.

While 'audience response systems' do exist, they are neither designed, nor optimized, for small conference rooms (e.g. for 12 or fewer people). They are designed for use with large crowds (e.g. hundreds or thousands of people). These systems are either wired or wireless.

It might be tempting to assume that wireless systems are always superior. However, for use around a small conference room table, these wireless systems are inherently inferior. They have numerous drawbacks, such as, a serious loss of anonymity (due to the need to see one's own keypad), unnecessarily high costs, time consuming setup and put-away (for every session), extensive training needed for the main operator, 12 or more batteries to go dead, unreliable operation due to radio frequency interference (or infrared occlusions), slow tally and display operation, complexity for users, frequent loss of remote units (that become misplaced, inadvertently left at home, dropped or stolen).

Likewise, the existing wired 'audience response systems' are designed for use with large crowds (e.g. hundreds or thousands of people). As such, they are not intended for practical, permanent installation in the numerous conference rooms for 12 or fewer people. They comprise unsightly tangles of cables, connectors and large, awkward enclosures that can not be properly mounted to the conference table without seriously destroying the normal utility of the table top surface or without infringing on legroom and comfort underneath the table. Again, they too suffer a serious loss of anonymity (due to the need to see one's own keypad), unnecessarily high installation costs (if permanent installation is attempted), and time consuming setup and put-away (for every session if not a truly permanent installation).

It would be highly advantageous, therefore, to remedy the foregoing and other deficiencies inherent in prior attempts to meet the unmet need.

Accordingly, it is an object of the present invention to provide a new and improved conference-table-based information system.

Another object of the present invention is to provide a new and improved conference-table-based information system that provides truly anonymous polling.

Another object of the present invention is to provide a new and improved conference-table-based information system with an easy and cost-effective method for permanent or temporary installation (easy enough to be organized as a 'do-it-yourself kit').

Yet another object of the present invention is to provide a new and improved conference-table-based information system with 'instant-on' access (virtually no setup/put-away time required), virtually no obstructions placed on the table top surface, ample legroom, no sharp edges to contact knees, pants or skirts and minimal training required to use basic polling functionality.

SUMMARY OF THE INVENTION

Briefly, to achieve the desired objects of the instant invention in accordance with a preferred embodiment thereof, provided is a table-based wired information system including a table having a plurality of actual positions designed to receive people, for the purpose of voting, playing games, etc. and a monitor positioned so as to be observed by people at any of the plurality of actual positions. A plurality of vote boxes, each including a switch with at least two positions, are secreted, one each, at each of the plurality of actual positions. A flat ribbon cable assembly with a plurality of electrical conductors less than the number of available positions (maximum number of potential positions of the table-based wired information system) is affixed to an under-surface of the table. The flat ribbon cable assembly is coupled to the monitor system and each of the vote boxes are coupled to the flat ribbon cable assembly intermediate the ends.

The above described objects and others are further realized in a method of mounting a table-based wired information system on a table including the following steps, which may be performed in any convenient sequence. A table is provided having a plurality of actual positions designed to receive people, for the purpose of voting, playing games, etc. The table has an under-surface accessible at each of the plurality of actual positions. A monitor is positioned so as to be readable by people at any of the plurality of actual positions. A flat ribbon cable assembly includes a flat ribbon cable with adhesive backing and a plurality of electrical conductors less than the number of available positions. The flat ribbon cable assembly is adhesively attached to the under-surface of the table in a flat orientation using the adhesive backing. The flat ribbon cable is coupled to the monitor system. A plurality of vote boxes is provided with each vote box of the plurality of vote boxes including a multi-position switch. One each of the plurality of vote boxes is adhesively attached to the under-surface of the table at each of the plurality of actual positions and each of the vote boxes is coupled to the flat ribbon cable intermediate the ends by a press-on insulation displacement connector.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

I. Overview of the System and Environment

Figure 1:
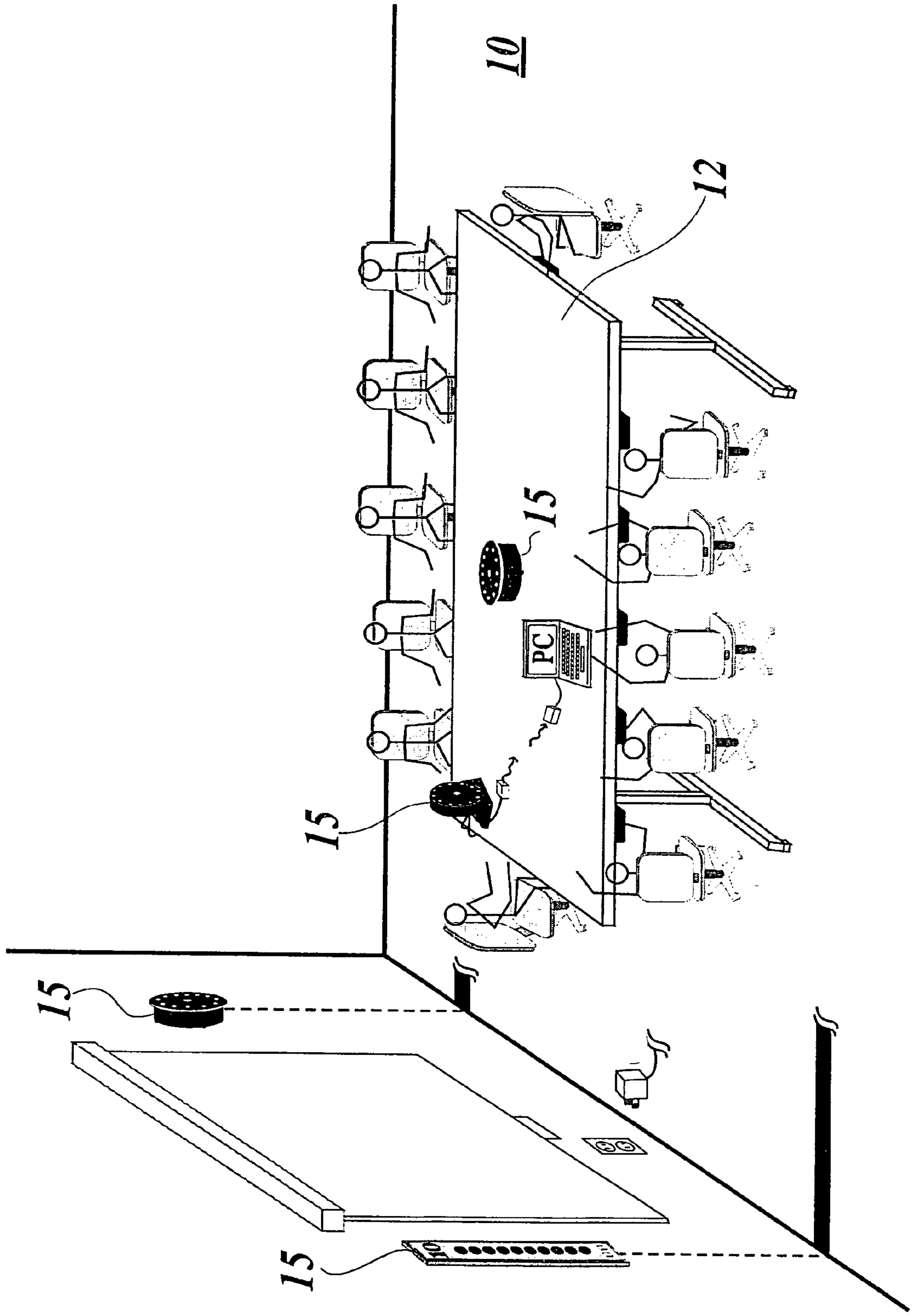
FIG. 1 is a top perspective view of a conference table with an installed voting system in accordance with the present invention.

Turning now to the drawings and specifically to FIG. 1, a portion of a typical conference room is illustrated. The conference room is equipped with an embodiment of a conference-table-based wired information system 10 in accordance with the present invention. A conference table 12 and twelve chairs are provided to accommodate up to twelve people for conference meetings. The purposes of such conference meetings can be extremely varied (as in, staff meetings, project reviews, problem solving meetings, brainstorming meetings, etc.). However, in general, group discussion is an important element in these meetings.

Figure 2:
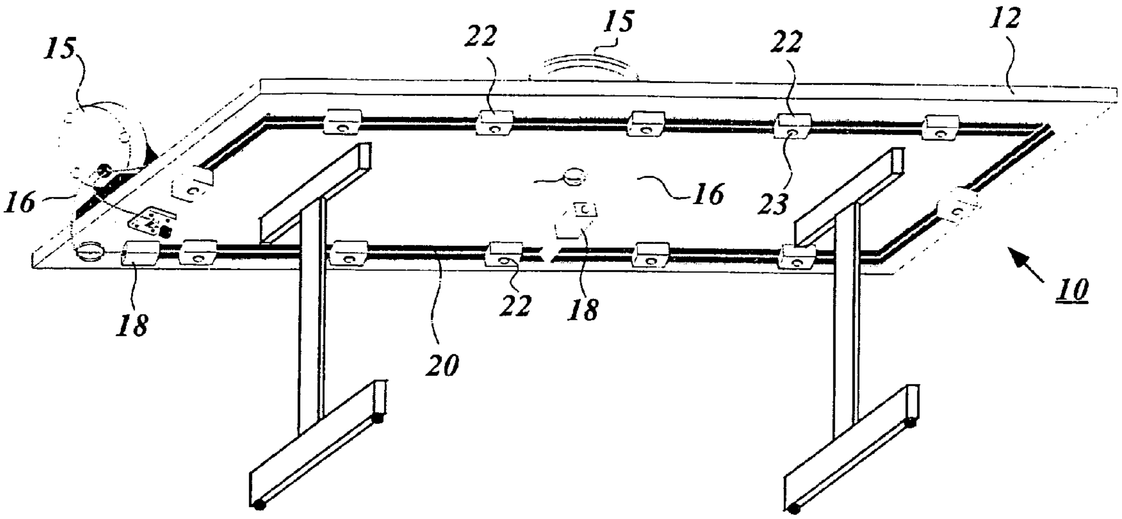
FIG. 2 is a bottom perspective view of the conference table and installed voting system of FIG. 1.
Figure 3:
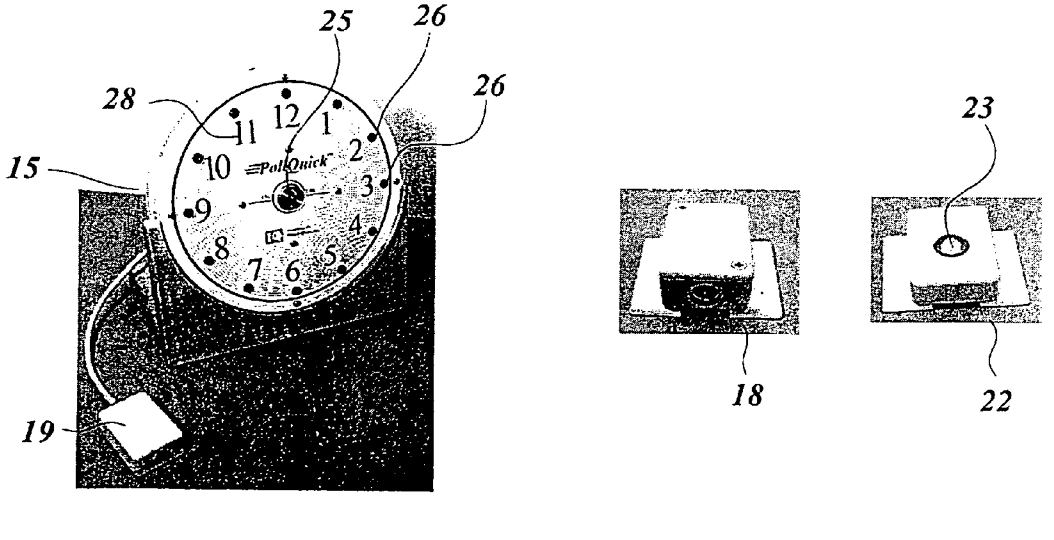
FIG. 3 is a perspective view of a monitor system (e.g. display console) used in the voting system of FIG. 1.

Referring additionally to FIGS. 2 and 3, on top of table 12, is a monitor system (e.g. display console) 15, which is electrically connected by a flexible round cable 16 through an adapter box 18 and then through a flat ribbon cable assembly 20 to twelve vote boxes 22, each of which has a key-switch 23, with which votes, opinions or responses are sensed. The votes are rapidly summed and this sum or tally is displayed on display console 15. It will be understood that while the system described is attached to a table, in some specific applications, the voting system might be molded into the table. Here it will be understood that while display console 15 is mounted on top of table 12 for convenience, the console could be located in various positions on the table (near the center, near an end, or near a corner) or on a room wall. The preferred location is near a corner of the table, where people tend to look during a presentation. The face of the display can be about 90 degrees (97 degrees works nicely) to the table top surface, to give excellent visibility as well as requiring short lengths of wiring and security cable to reach the table's under surface. (In general, the corners of tabletops are often unoccupied during traditional meetings). An optional stand can be made with a fine wood finish (e.g. maple, cherry or walnut) in order to add visual appeal (especially for use in expensive boardrooms). Here it will be understood that the console can be securely attached to the table top via various means, including clamps that do not damage the table top. An optional infrared (IR) emitter (or transceiver) 19 can link display console 15 with a personal computer (PC) or personal digital assistant (PDA), or the like, if desired.

II. Typical Operation of the System

People gather in the conference room and seat themselves in a chair at conference table 12. One person presses, and holds for about one second, a power button 25 on console 15. After this power-up-request is issued, a microcomputer (MCU) (described in more detail below) inside console 15 begins running. The MCU turns on all of the critical display elements so that any defective display elements can be visually detected by the people present. This feature is included to avoid any inaccurate display of the true vote tally. It also familiarizes new people with the system's display. Next, the MCU directs console 15 to make an audible sequence of tones (e.g. low-then-high pitch), confirming that this 'display test' has ended and that the system is ready to display actual vote tallies. Here it will be understood that a similar feature will be incorporated for any optional displays being used. All of this takes about three seconds. It should be noted that this feature is much faster than the extensive setups required of 'competing' wired or wireless audience response systems and much faster than starting a typical personal computer.

One person, perhaps a meeting facilitator, asks a question, directing it at the present voters (most or all of the people seated at table 12). This can be just a spoken question, a written question, or both. For example, written questions, can be prepared before the meeting and projected from a notebook PC through a video projector. Alternatively, someone can simply use markers on a white board or flip chart (this is especially useful for impromptu questions). The voters think about what their individual anonymous responses will be, then either they press or don't press the vote button 23 on the vote box 22 associated with their chair. Each voter's vote box 22 and button 23 is located near them, under table 12 near the table edge. The location is such that the position and movement of the voters hand is hidden from view by others, while still being easy to reach and press. The mechanical action, of pressing the button 23, is virtually inaudible due to specially selected or specially built key switches. This eliminates undesirable auditory hints of the otherwise anonymous vote. Furthermore, silent tactile feedback (e.g. an abrupt change in force that was opposing the voter's finger) confirms to the individual voter that his key switch has made electrical contact. These precautions are desired because voters are sitting in very close proximity (typically within 30 inches) of each other. Thus, the direct voting actions are secreted from voters sitting in close proximity.

Almost instantly, the MCU totals and displays the number of vote buttons currently being pressed. The system is potentially so fast that all vote buttons can be scanned, tallied and displayed in less than 1/60 of a second. To the voters, this scan-tally-display process seems to be instantaneous. (In fact, with a fast enough scan, the MCU could count rapid vote button press-and-release actions for every voting person, thereby further expanding the expressiveness of 'one-button' vote boxes. For example, each voter could press his/her button n times, where n is his/her selected option/choice for a multiple choice question. Here, switch de-bouncing [e.g. a resistor and/or capacitor circuit across each switch] may be necessary). Of course, if desired, the system can be run more slowly (which may be more 'self explanatory' to some voters).

Some of the kinds of questions that are effectively answered with this system are 'True/False', 'True/False/Abstain', 'Multiple Choice', 'Continuous Ratings', 'Likart Scale Ratings', 'Is the current topic of discussion relevant?', 'Decision Tree', 'Hyperlink Action' and 'Group navigation' questions. All can be accomplished with one vote button per voter.

For example, a 'True/False/Abstain' kind of question can be answered by asking two questions sequentially (e.g. Ask "Is it true?" then ask "Is it false?". Press no key to abstain. Alternatively, two vote buttons (one labeled 'true' and the other labeled 'false') could be placed in each vote box such that the voters would have to press one or the other, unless they wished to abstain. This would enable more consistent anonymity by discouraging voters from intentionally or unintentionally 'tipping their hand'. Here, 'tipping their hand' means making a 'no' vote public by showing both of their hands (far away from their vote button) throughout the voting period.

Likewise, a multiple choice question can be asked as a sequence of questions, each being answerable by "true" or "false". Since, experts in traditional polling strongly recommend that multiple choice questions contain no more than four alternatives anyway, this sequential process is very practical. The power (versatility) of single-button-voting is surprising to many people.

III. Component-by-Component Description of the Preferred Embodiment

A. Display Devices for Indicating Results

Illustrated in FIG. 3 is a perspective view of display console 15, which includes ultra-bright 'light emitting diodes' (LEDs) 26 equally spaced around the face of display console 15, and corresponding labels 28 (e.g. numbers). Voting results are almost instantly displayed by LEDs 26 and the corresponding labels 28. Optionally, voting results can be displayed on a computer screen (not shown), if the computer is coupled to an infrared link (described in conjunction with FIG. 4A below) in console 15. Note that the infrared link is not the only option here. For example, the display console circuit could use direct wiring to (and from) a PC. Yet another option is the use of an RF link for console to PC communications. The computer display is virtually unlimited in potential display formats. (Even without using a PC, the display portion of the display console could be wirelessly linked (using IR of RF) to the remainder of the display console, in order to allow more locations around the conference room for placing the actual display). Furthermore, a rudimentary 'vote switch scanner' could wirelessly send information to both a separately enclosed display and to a PC.

In the illustrated arrangement of LEDs 26 in console 15, the vote tally can be displayed by a 'curved bar graph', in which n LEDs glow to represent a tally of n votes, where n is an integer in the range of 0 to 12. For example, if the tally is zero, then no LEDs light, and if the tally is 12, then all 12 LEDs light. Alternatively, a single glowing LED representation can be used. That is, If the tally is n, then only the single LED which is labeled n is allowed to glow. Here n is an integer in the range of 1 to 12. For example, if the tally is zero, then no LEDs light and if the tally is 12 then the LED adjacent the number 12 will light.

The LEDs are time multiplexed, to reduce MCU pin requirements, interconnects to (optional) remote LED displays, and to reduce the power when many LEDs seem to be simultaneously glowing. The LEDs are activated in three groups of four LEDs per group. Sweeping through all LEDs can be done quickly (e.g. faster than 16 milliseconds per complete sweep) in order to virtually eliminate a perception of flicker. Here it will be understood that other display formats are possible too (e.g. seven-segment, 5×7 dot matrix, vertical stack of lights, etc.).

By placing the MCU between the PC and the under-table-network, security risks from an 'anonymity loss' are minimized. That is, it is much more difficult to hack the specialized assembly language MCU code, which is rendered unreadable by blown fuses in the MCU. (To hack PC software is much easier).

If even further security is desired, encryption checks could be made as follows: Along with each vote result, a digital 'system integrity' code could be displayed and stored. After a sequence of votes, the sequence of tally values plus the sequence of system integrity codes could be uploaded via internet to a web site that responds with 'valid' or 'invalid'. If 'invalid', then tampering could have occurred. The complex encryption code would be computed in the MCU via its unreadable firmware.

B. Vote Sensing Apparatus

Cable 16 couples information from flat ribbon cable assembly 20 and distributed vote boxes 22 to the MCU. The MCU, designated 30, is illustrated schematically in FIG. 4A. Cable 16 can also supply electrical power to flat ribbon cable assembly 20 and, thence, to distributed vote boxes 22, if desired, although not explicitly shown in FIG. 4. For example, one could simply apply Vdd to conductor-6 and Vss to conductor-5 of flat ribbon cable assembly 20, instead of grounding both conductors. In the embodiment shown in FIG. 4A, MCU 30 selectively controls the logic level (e.g. +5 volts or 0 volts) on four conductors 32 called 'group 0', four conductors 34 called 'group 1', four conductors 36 called 'group 2', and four conductors 38 called 'group 3'. A high logic level (e.g. +5 volts) on any group, activates that unique group of four vote boxes 22. Any activated group couples four bits of information to the MCU, representing four votes (e.g. a high logic level means 'yes, the associated button 23 is being pressed'; a low logic level means 'no, the associated button 23 is NOT being pressed, at the moment'). Four groups of diodes 40 are connected in series with the switches 23 of vote boxes 22 in each of the four groups in order to limit or electrically isolate, the number of high conductivity paths, which could otherwise result in erroneous vote tallies.

For reduced EMI, R-C filters 42 (e.g. R0 and C0) are used. This slows the voltage slew rate. However, in order to have MCU 30 read the vote button switch positions correctly, pull-down resistors R8 through R11 (100 k ohm resistors), generally designated 44, must discharge most of the residual charge on long ribbon cable 20 (and capacitors C0 through C3). To ensure that the discharge occurs rapidly enough, MCU 30 is programmed to momentarily switch MCU input pins on the lower left I/O port from their normal high impedance inputs to low level (low impedance) outputs, thereby pre-discharging the input 4 bit bus (before reading the 4 bit result at input pins on the lower left I/O port). It will be understood that if the same functions described above are accomplished using 'negative logic,' then pre-charging (instead of pre-discharging) can be employed.

C. The Microcomputer (MCU 30)

In this embodiment, microcomputer 30 is a low power 8 bit MCU. Low power is desirable so that the whole system can operate from a few small batteries for months. This eliminates routing wiring to the mains, an AC wall adapter, and more expensive electromagnetic interference (EMI) shielding to meet FCC regulations. There is an exception to the otherwise required FCC testing for products, if they are not connected to the power mains, they use no clocks above 1 MHz and they are not conductively connected to a personal computer. (An IR link to a PC can be electrically non-conductive for EMI). An external crystal 46 determines the clock rate, which is low (about 38 kHz) in order to conserve power and reduce EMI. Two ports are essentially dedicated to scanning vote boxes 22 (each is a momentary contact, normally open, SPST switch). It will be understood by those skilled in the art that by combining vote tallies of more than 12 vote boxes, larger groups can be polled. This can be accomplished, for example, by replacing diodes 40 in FIG. 4A with transistors, as shown in FIG. 4B or a storage element, as shown in FIG. 4C.

Figure 4A:
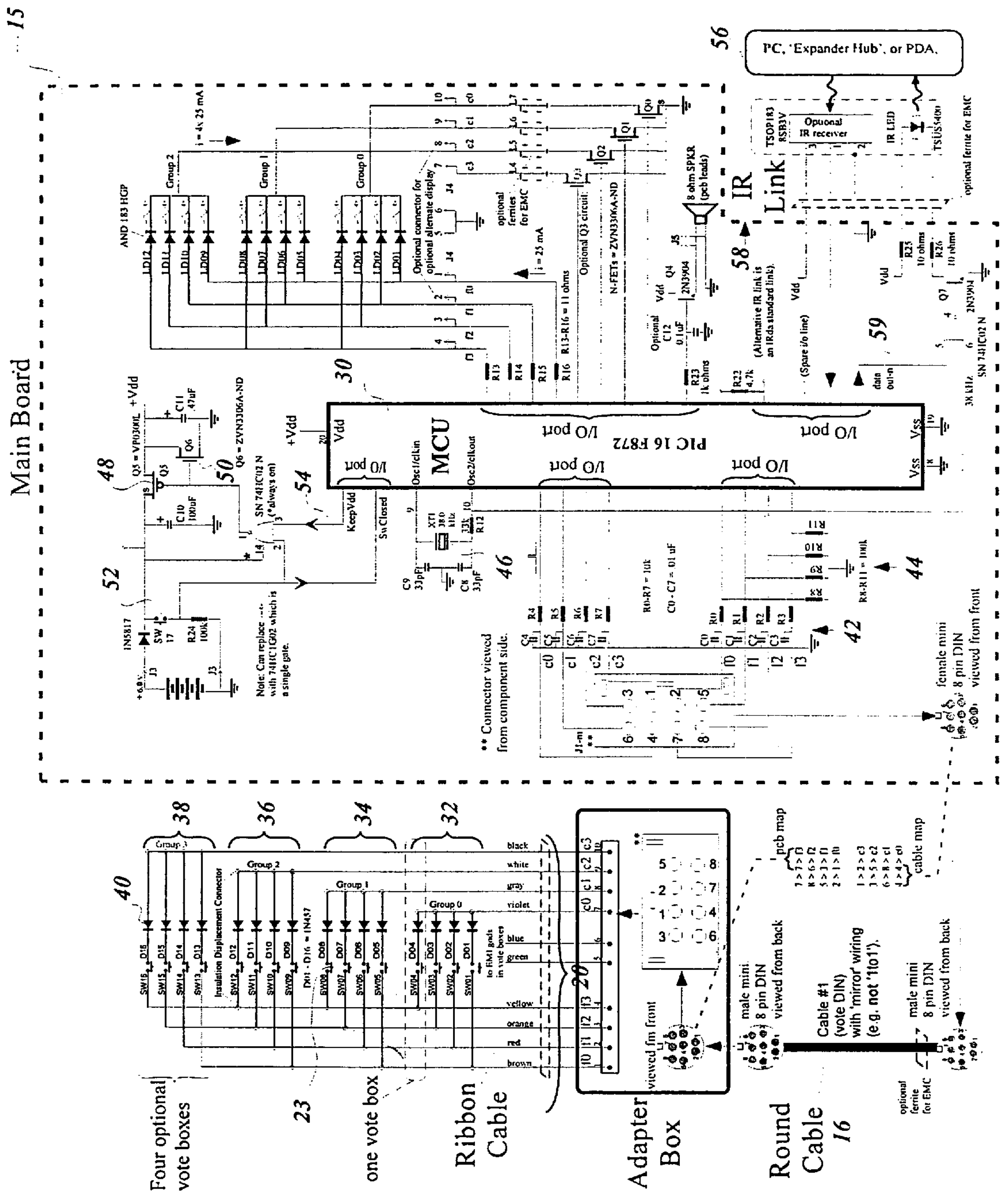
FIG. 4A is a schematic diagram of circuitry, cables and connectors of the display console of FIG. 3.
Figure 4B:
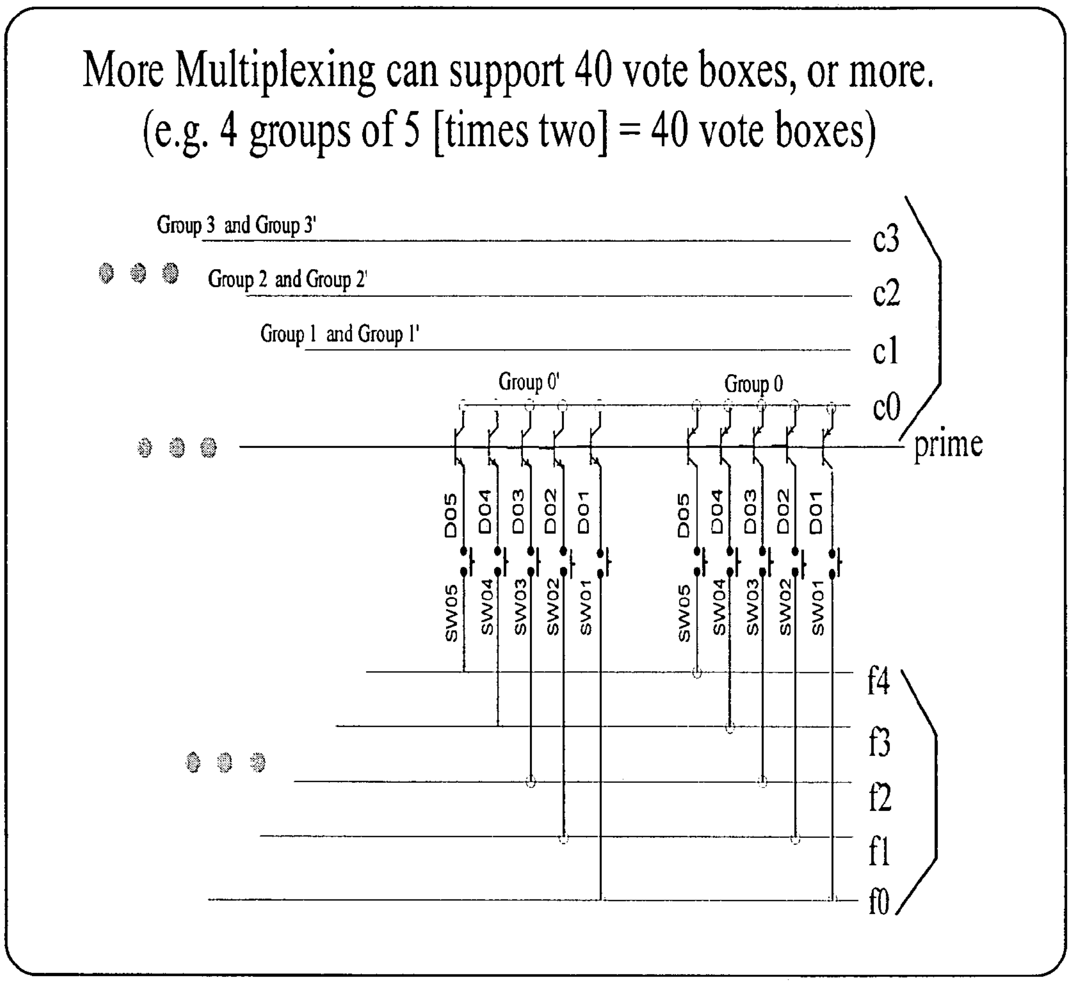
FIG. 4B is a schematic diagram of another embodiment of multiplexing circuitry of the display console of FIG. 3.
Figure 4C:
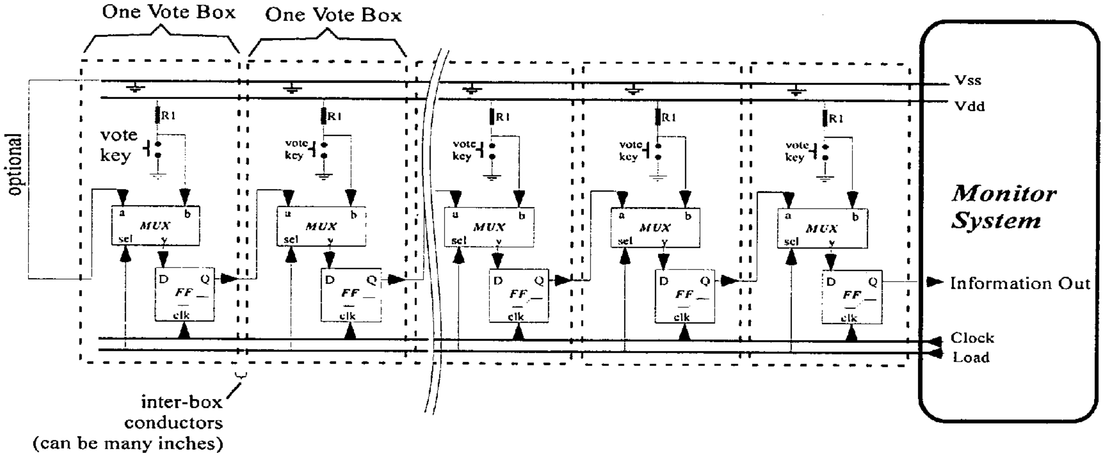
FIG. 4C is a schematic diagram of another embodiment of multiplexing circuitry of the display console of FIG. 3.

Referring additionally to FIG. 4B, a schematic diagram of circuitry for combining the vote tally from up to 40 vote boxes is illustrated, with the diodes of FIG. 4A replaced with transistors (or a digital comparator, in the general case) and one of the buses comprises five conductors instead of four conductors). Thus, the same 10 conductor ribbon cable (or fewer conductors if desired) can easily tally votes from 40 vote boxes, without integrated circuits in the vote boxes (also without Vdd and Gnd conductors to the vote boxes). This can use a display format capable of displaying a vote tally of about 40. In summary, the schematic in FIG. 4B illustrates a simple means of increasing the number of vote switches (and voters) for one display console like that in FIG. 4A. The bipolar NPN transistors and PNP transistors can select one of two groups, depending upon the logic state of a prime line. In addition, the transistors prevent current from flowing up through the switches that, otherwise, could yield a false vote tally reading. Note that the same functionality, arising from using bipolar transistors, can be achieved by using field effect transistors (FETs) as the switching devices (possibly with diodes to restrict the direction of current flow). Also, note that the same functionality, arising from using bipolar transistors, can be achieved by using integrated circuit (IC) gates, as long as Vdd and Vss are provided for the IC gates. The systems illustrated in FIGS. 4A, 4B and 4C all incorporate multiplexing, where the term "multiplexing" is defined in this disclosure as reuse of a small number of electrical conductors, compared to the number of available voting positions, to convey different information at different times. It should be understood that the number of voting positions actually wired into the system can be less than the available voting positions that the system can support. For example, the number of electrical conductors used will generally be less than the number of voting positions available.

In FIG. 4B, Thus, the same ten conductor ribbon cable can easily tally votes from forty vote boxes, without integrated circuits in the vote boxes (also without Vdd and Gnd conductors to the vote boxes). This can use a display format capable of displaying a vote tally of about forty.

D. Power Control

In FIG. 4A, field effect transistors 48 and 50 can be used to turn off the system by commands from MCU 30. A console power-mode switch 52 (a momentary contact, normally open, SPST switch) can turn on the system. This is done by providing a temporary path for power to MCU 30 which then turns on a 'keep on' logic level 54 to keep the power FET on, until MCU 30 issues a 'turn-off-the-system' command. FET 50 is used to shunt to ground any power that may arrive from a (directly wired) PC interface (which might otherwise prohibit the complete turn off of the system).

E. Interface to a Personal Computer (PC)

As stated elsewhere, a PC can be included, if desired, to expand the functionality of the basic 'PC-less' system. Thus, a few MCU pins are dedicated to input and output from and to an optional PC 56. In this embodiment, an infrared link 58 is used to couple PC 56 to an output lead 59. Note that infrared link is not the only option here and a direct wiring to (and optionally from) a PC or a radio frequency (RF) link for console to PC communications could be used, if desired.

F. Mode Setting

Although there is only one console power switch 52, it can perform multiple tasks. If power is off, a brief press will turn on power. If power is on, a sustained press and hold (for over 3 seconds) turns the power off. If power is on, a very brief tap (<2 seconds) can enter a mode setting process, in which LEDs sequentially glow. Here, each LED can have an associated action (e.g. 'turn sound off'). A second tap, at the appropriate time (when the associated LED is glowing) can initiate the associated action. Each or all of these modes can be easily programmed into MCU 30 in a well known fashion.

G. Cables

Cable 16 is an easily flexed, round cross-section, cable that connects the MCU ports to adapter box 18. (Note: Adapter box 18 could be omitted and a more direct connection made from ribbon cable 20 to the MCU ports. However, there are drawbacks. In the preferred embodiment ribbon cable 20 is a self-adhesive-ribbon-cable. In the direct connection embodiment, some fraction of the self-adhesive-ribbon-cable would have to be left without adhesive. Also, flat ribbon cable assembly 20 is awkward and unsightly for customers to work with. Furthermore, flat ribbon cable assembly 20 could develop open circuits if flexed excessively. Finally, if cable 16, with the round cross section, is often flexed, plugged in or unplugged and becomes defective, it can be simply replaced, if adapter box 18 is included.

An optional cable, which in this embodiment is an easily flexed, round cross-section cable similar to cable 16, is used to connect one or more MCU I/O ports to an IR emitter or transceiver or more directly to a PC port (e.g. a parallel printer port). Through the optional cable, MCU 30 can report the sum of individual votes, without revealing the individual votes themselves, to a remotely located PC. (It will be understood that this cable can be eliminated if the infrared emitter or transceiver is mounted directly on the main printed circuit board).

H. Vote Box

Figure 5:
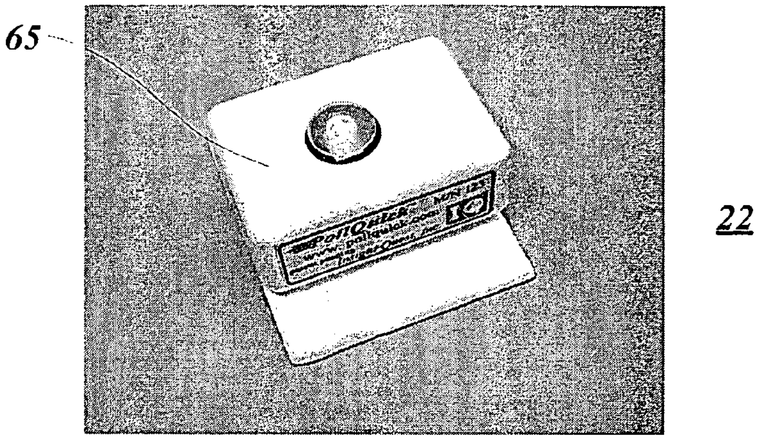
FIG. 5 is a top front perspective view of a vote box used in the voting system of FIG. 1 (It should be understood that throughout the specification, the terms "top" and "bottom" are with reference to specific figures and not necessarily actual installed orientations)
Figure 6:
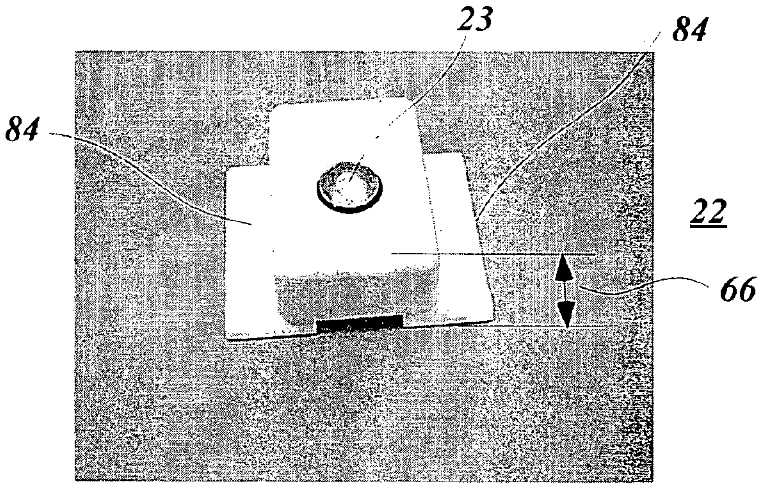
FIG. 6 is a top end perspective view of the vote box of FIG. 5.
Figure 7:
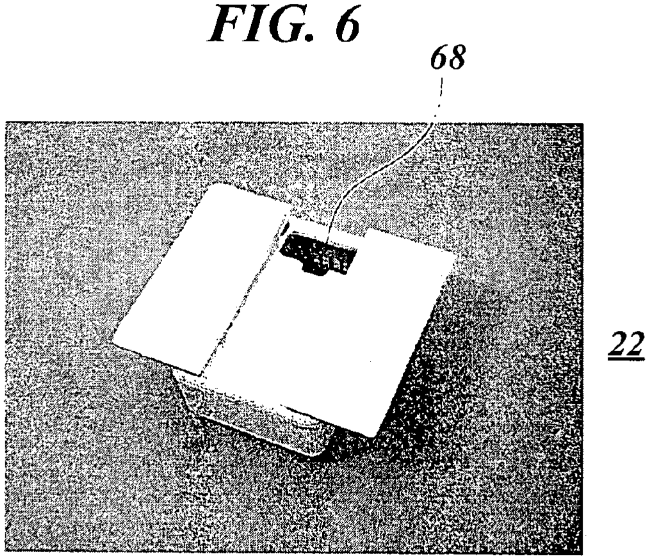
FIG. 7 is a bottom end perspective view of the vote box of FIG. 5.

Nearby each voting person around table 12 is a vote box 22 in a specially designed housing. As shown in FIGS. 5, 6, and 7, push button switch 23 with a keycap is mounted inside specially designed housing 65. Housing 65 is typically fastened to the undersurface of conference table 12, well within easy reach of the voting person (e.g., about one inch to three inches from the tables outer edge). The voting person simply presses push button switch 23 upward, toward the table top. Alternatively, if the vote box is equipped with an optional FBLRU-type control (substantially similar a well known joystick), the voting person pushes Forward, pulls Backward, pushes Left, pushes Right or pushes Upward to record their vote.

Push button switch 23 is recessed within a hole in housing 65 that is chamfered to allow comfortable finger access to fully depress push button switch 23. All edges of housing 65 that could be accidentally bumped by a person's knee, pant legs, skirt or hand are devoid of sharp edges. The overall height (indicated as 66 in FIG. 6) of housing 65 should be as small as is practical, in order to maximize unobstructed legroom under the table.

Furthermore, the edges (front and sides) of the enclosure are of sufficiently large radius so as to deflect much of any bumping force upward into the rigid table undersurface. That is, a person's knee should be gently deflected under the vote box enclosure, rather than abruptly (painfully) impacting any vertical edge of the vote box enclosure. Toward this goal, the front edges and end edges are of large radius as illustrated in FIGS. 5 and 6 (or can be sloped at about 45 degrees).

Figure 10:
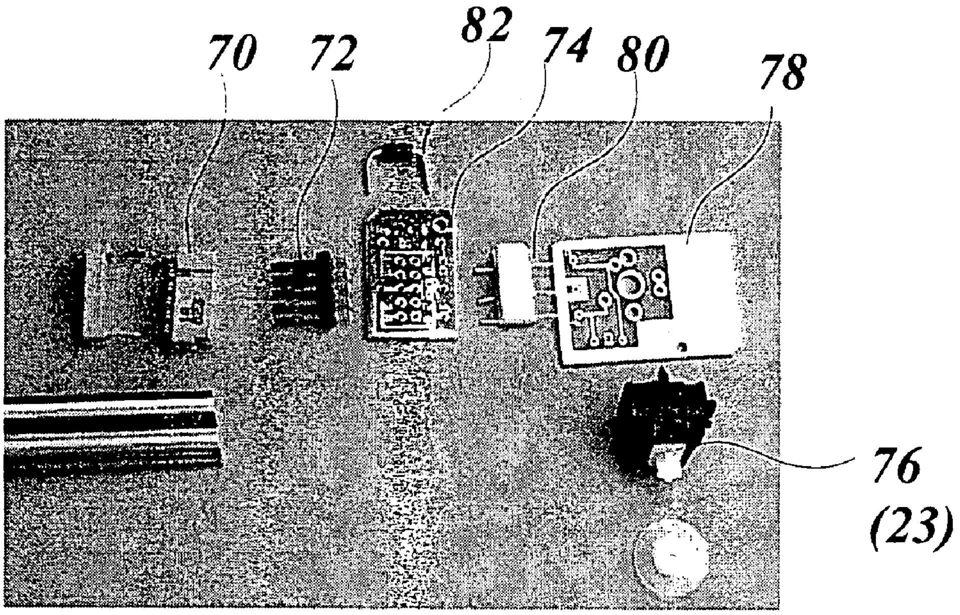
FIG. 10 is an exploded perspective view of the components of the vote box of FIG. 5.

An opening 68 in the bottom of housing 65 is chamfered to easily guide a mating electrical connector 70 (see the exploded view in FIG. 10) in vote box 22, into mating engagement with a header 72. A printed circuit board 78 contains a switch 76 (momentary contact, normally open, SPST, silent action, with tactile feedback). Switch 76 is covered by a keycap and forms a portion of switch 23. Printed circuit board 78 is electrically coupled to another printed circuit board 74 via two (or three if shielding is used) conductors 80. Printed circuit board 74 supports header 72 (10 gold plated square 0.025 inch×0.025 inch posts), a diode 82 and one end of the two (or three if shielding is used) conductors 80. Holes through boards 74 and 78 are used to attach the boards to housing 65, which in this embodiment is an off-the-shelf plastic enclosure. (Note: It is will be understood that boards 74 and 78 could be combined [or perhaps eliminated] if a different switch and/or connector were used). An optional capacitor (not shown) can be used to shunt undesired RF energy to ground to reduce EMI, if desired. Diode 82 (one of diodes 40 in FIG. 4A) is used in order to limit the number of high conductivity paths, which could otherwise result in erroneous vote tallies.

A pair of flanges 84 in FIG. 6 are affixed to the lower surface of housing 65 in spaced apart relationship and are directed outwardly in opposite directions. Flanges 84 provide essentially planar mounting structures that provide a large surface area (for secure adhesive bonding to the undersurface of table 12). Also, flanges 84 are offset or spaced apart on the lower surface of housing 65, so as to define an open channel (air gap) between the undersurface of table 12 and housing 65 of vote box 22, through which the adhesive backed flat ribbon cable assembly 20 extends.

J. Adapter Box

Figure 8:
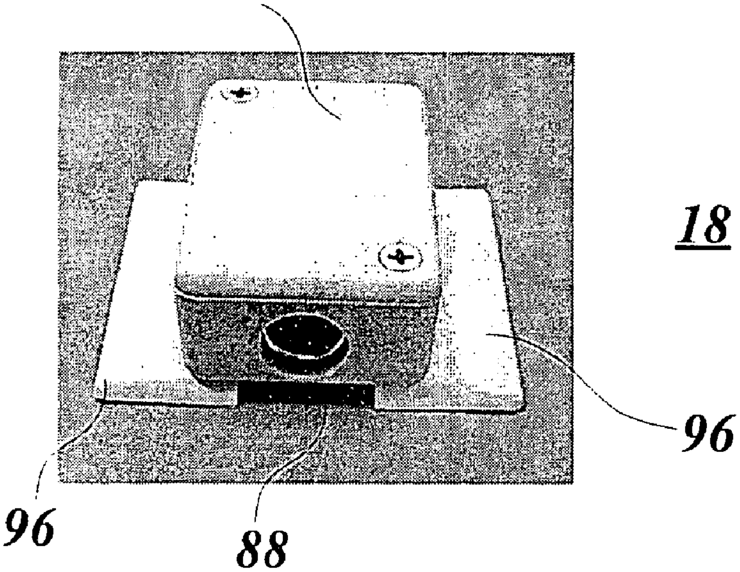
FIG. 8 is a top end perspective view of an adapter box used in the voting system of FIG. 1.
Figure 9:
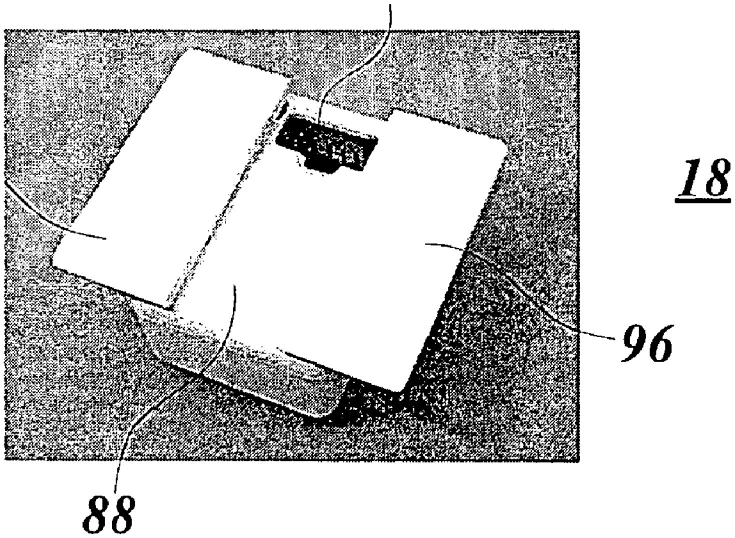
FIG. 9 is a bottom end perspective view of the adapter box of FIG. 8.

Anywhere along the adhesive backed ribbon cable 20 (generally at one end), the electrical signals are coupled to the console via adapter box 18 enclosed in a housing 86, as illustrated in FIGS. 8 and 9. If housing 86 is located where knees or hands can bump into it, the shape of housing 86 will be generally designed as described above with relation to housing 65 of each vote box 22. That is, housing 86 is generally constrained as follows: the overall height of the enclosure (like housing 65) is as small as is practical, in order to maximize unobstructed legroom under the table. Furthermore, the edges (front, and sides) of the housing are of sufficiently large radius (or the like) so as to deflect much of the bumping force upward into the rigid table undersurface. That is, a person's knee is gently deflected by the vote box and/or adapter box housing, rather that abruptly (painfully) impacting any vertical edge thereof. Toward this goal, the edges are of large radius, as illustrated in FIG. 8, or are sloped at about 45 degrees. Here it will be understood that the term "box" in "vote box" and "adapter box" does not restrict the shape of the housings nor flanges to a rectangular shapes. The vote boxes and adapter boxes can be basically round or basically elliptical, yet still provide flange and channel functions.

Figure 11:
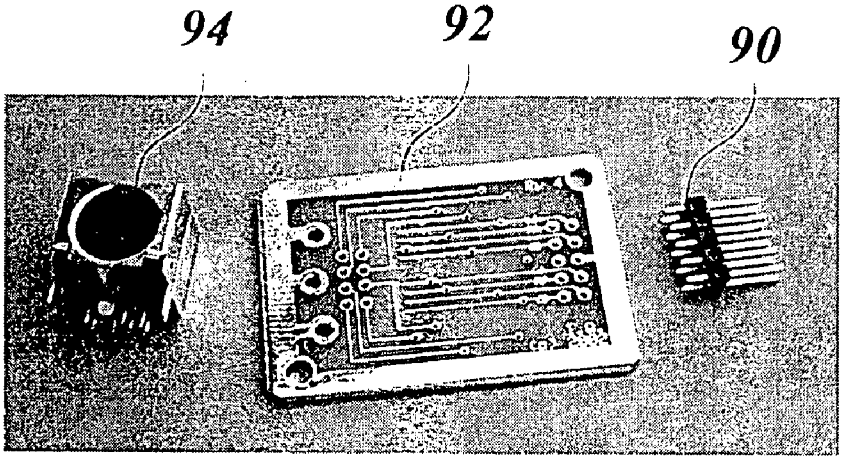
FIG. 11 is an exploded perspective view of the components of the adapter box of FIG. 8.

An opening slot 87 in the lower surface of housing 86 is chamfered to easily guide a mating electrical connector (similar to connector 70 in FIG. 10) into adapter box 18, so as to, mate with a header 90 (10 gold plated square 0.025 inch× 0.025 inch posts) illustrated in FIG. 11. Header 90 is affixed (e.g. soldered or staked) to a printed circuit board 92 that also has mounted thereon a connector 94 (an eight conductor shielded miniDIN), which can mate with a flexible round computer cable [like an Apple® printer cable)]. Adapter box 18 electrically couples the ten conductors of flat ribbon cable assembly 20 to the nine conductors (or 10 with another choice [e.g. a shielded DB9 connector] of connector) in the round cross section cable 16. Two conductors of the ten conductor flat ribbon cable assembly 20 are electrically connected, by printed circuit board 92, to the shield of the round cross section cable 16. An optional capacitor (not shown) can shunt undesired RF energy to ground to reduce EMI.

Mounting flanges 96 (in FIG. 8 and FIG. 9) are essentially planar structures affixed in a spaced apart opposed relationship to a lower surface of housing 86. Flanges 96 provide a large surface area (for secure adhesive bonding to the undersurface of table 12). Also, flanges 96 are offset, or spaced apart, on the lower surface of housing 86, so as to define an open channel (air gap) 88 between the undersurface of table 12 and the lower surface of adapter box housing 86, through which adhesive backed flat ribbon cable assembly 20 extends. Here it will be understood that the functions of the housings like 86 and flanges like 96 can be provided by a more integrated, molded structure (e.g. one or more injection molded parts thereby resulting in lower production and assembly costs).

K. Self-Adhesive Ribbon Cable and Connectors

Figure 12:
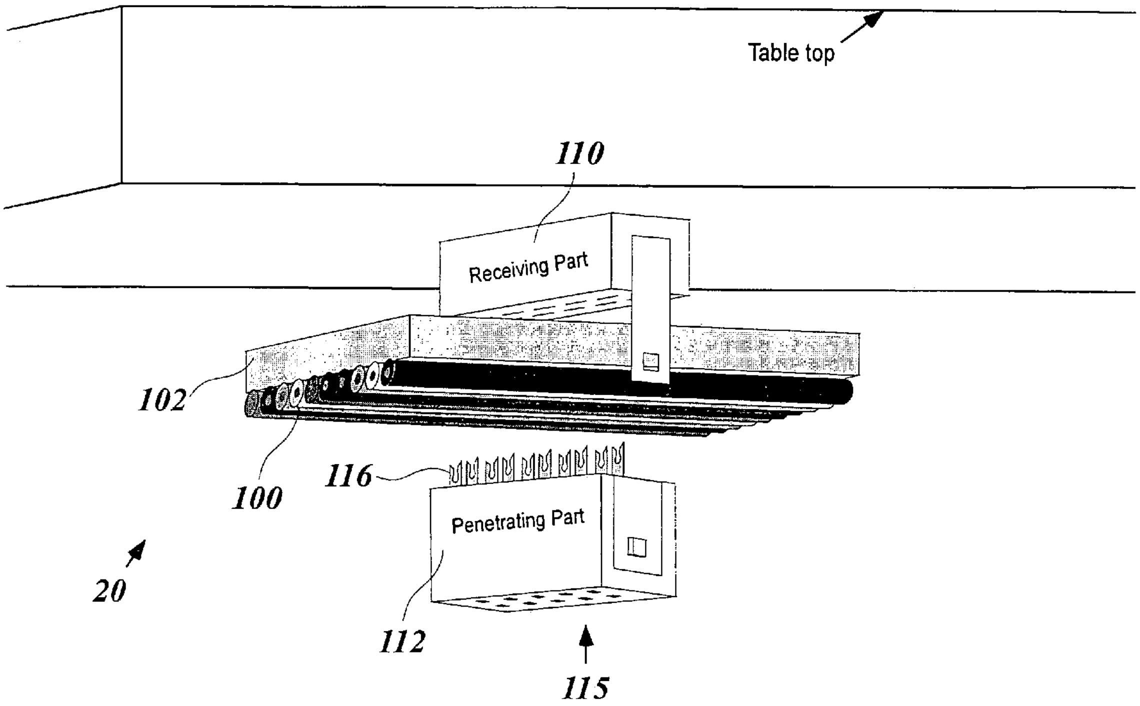
FIG. 12 is a perspective view of a self-adhesive flat ribbon cable assembly with an insulation displacing connector (IDC) in accordance with the present invention.

In this preferred embodiment, flat ribbon cable assembly 20 (of FIG. 2) is, for example, an adhesive backed multi-conductor (ten in this embodiment) flat cable, an enlarged view of which is illustrated in FIG. 12. In this embodiment, a multi-conductor flat cable 100 with an adhesive layer 102 affixed to one side is used as flat ribbon cable assembly 20. As will be explained in more detail presently, flat cable 100 and adhesive layer 102 are provided separately and affixed together to form adhesive backed flat ribbon cable assembly 20. Generally, adhesive layer 102 has a release liner/backing that gets removed during the installation process.

In addition, to adhesive backed multi-conductor flat ribbon cable assembly 20, a two-part press-on insulation displacement connector 115 is illustrated in FIG. 12. Connector 115 includes a receiving part 110 and a mating penetrating part 112. Penetrating part 112 has electrically conductive blades/contacts 116 that penetrate the insulation of flat ribbon cable assembly 20 and make electrical contact with the electrical conductors therein. Blades/contacts 116 extend through adhesive layer 102 and are received by mating slots in receiving part 110.

By properly timing the application of pressure on parts 110 and 112 during installation, adhesive layer 102 is substantially squeezed out from between parts 110 and 112, thereby allowing the correct mating between parts 110 and 112. (i.e. this forces out a substantial portion of the adhesive backing from between the connector parts). For example, minimal pressure for at least 1 second suffices and provides a subtle-but-very-significant benefit: connectors 115 can be installed anywhere it is desired to situate a vote box 22 or an adapter box 18 along the flat ribbon cable assembly 20 without the complexity of first removing adhesive layer 102 at the installation point. Thus, the 'first remove adhesive layer 102' option is not preferred (but it is still possible). An additional benefit is an adhesive bond produced by the remaining adhesive layer 102 between parts 110 and 112, thereby avoiding connector failures due to parts 110 and 112 inadvertently separating.

IV. Installation of the Under-Table-Network

A. Converting Adhesive Backed Ribbon Cable

Figure 14:
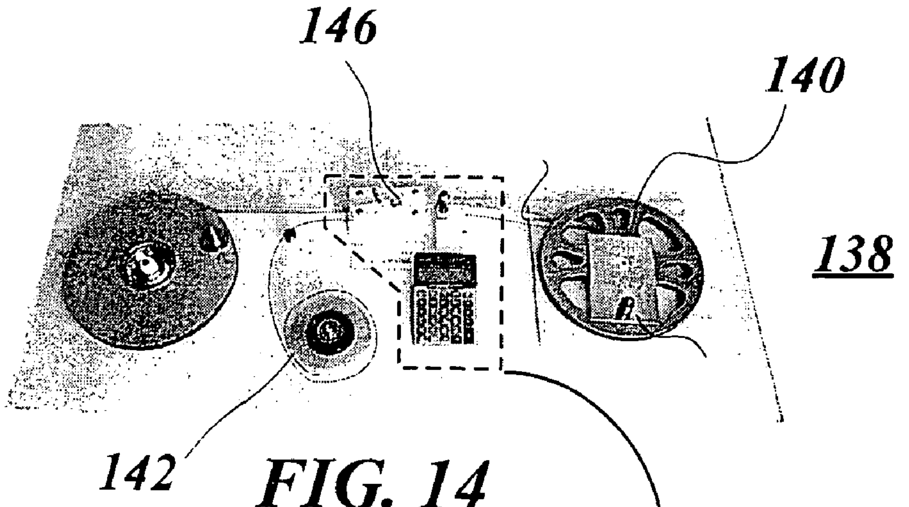
FIG. 14 is a perspective view of a laminating machine used to bond separately reeled adhesive and separately reeled non-self-adhesive flat ribbon cable into a single bonded lamination in accordance with the present invention.
Figure 15:
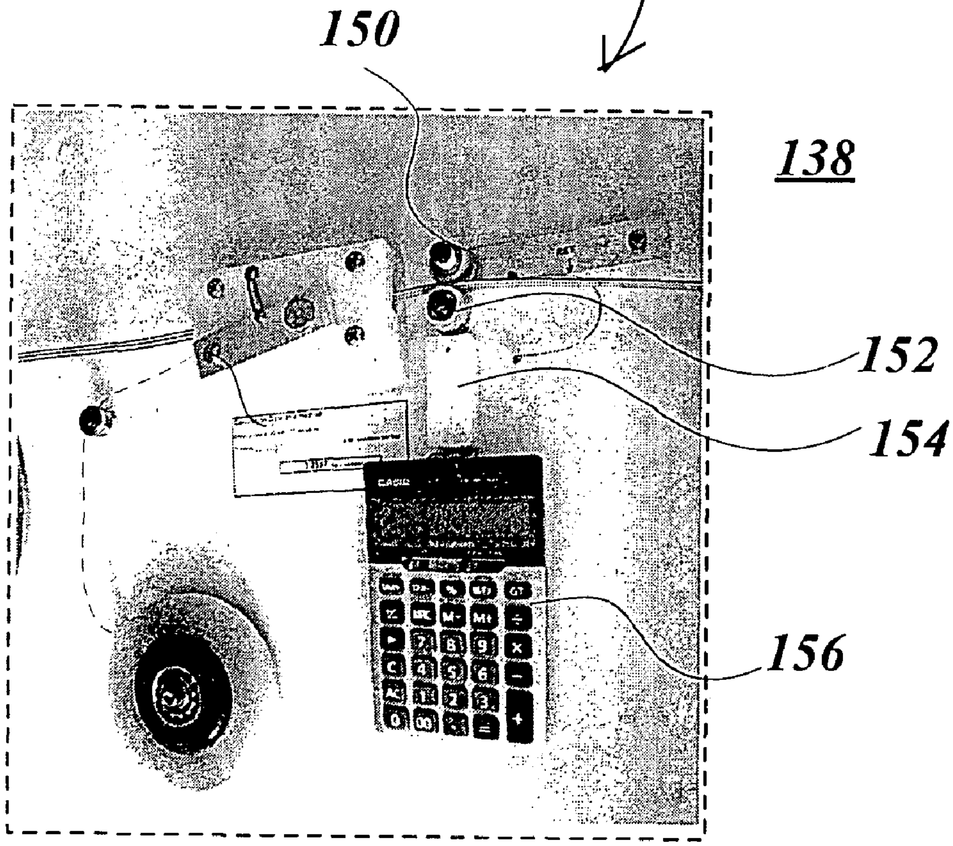
FIG. 15 is an enlarged perspective view of a central portion of the laminating machine of FIG. 14.

In one preferred embodiment, the information conductors for the conference-table-based wired information system 10 are copper wires in a ten conductor ribbon cable 100 (see FIG. 12) with 0.1 inch pitch. In this embodiment, a carefully chosen ½ inch wide, double-sided adhesive tape 102 is bonded all along the ½ inch wide ribbon cable 100. Double-sided adhesive tape 102 has a release liner that is not removed, yet. A laminating machine 138 to accomplish this converting process is shown in FIGS. 14 and 15. By turning a crank and, hence, take-up reel 140, adhesive tape 102 from a reel 142 and ribbon cable 100 from a reel are joined or pressed together by a compression unit 146. Compression unit 146 includes an aligner and pressure roller block, which is made of UHMW (ultra high molecular weight) plastic that has an extremely low coefficient of friction (lower than Teflon® and also has a low surface energy (it bonds poorly with adhesives). This allows the bonded ribbon-with-adhesive to be pulled with low friction (and without undesired adhesive-sticking to the block). The aligner part (a half inch wide slit in the UHMW) of keeps the ribbon and adhesive tape edges in accurate registration with each other and with the pressure rollers. The pressure rollers are biased toward each other by a spring in order to firmly and uniformly press the adhesive tape onto the ribbon cable for a permanent bond along the length of the ribbon cable. The completed self-adhesive-ribbon-cable 20 is then reeled up onto take-up reel 140. Of course, this can be motorized or performed on a commercial converting machine. Since adhesive-backed-ribbon-cable 20 is not currently commercially available, laminating machine 138 was designed and built to efficiently and accurately combine the components that are commercially available, i.e. ribbon cable 100 and double sided adhesive tape 102.

B. Measuring the Length Of Converter Ribbon

Two silicone rubber coated wheels 150 and 152 (see FIG. 15) lightly 'pinch' the adhesive-backed-ribbon and rotate at a rate proportional to the linear speed of the adhesive-backed-ribbon. Wheel 152 contains a small permanent magnet (not shown) that is sensed by a magnetic reed switch 154 (or Hall effect sensor). Magnetic reed switch 154 is connected in parallel with the '=' key on a calculator 156. In this specific application, when calculator 156 is 'programmed' with the key sequence, '0.245', '+', '+' then each revolution of the magnet adds the conversion factor 0.245 to the previous sum, thereby giving a direct readout calibrated in feet. (The specific value '0.245' was empirically determined by running a pre-measured length, e.g. 10 feet, of ribbon cable through rollers 150 and 152 and calculating the equivalent 'feet per revolution' of roller 152). Using this method (or a similar measuring technique), the length of the finished adhesive-backed-ribbon can be easily determined.

C. Installing Cables and Boxes on a Table Undersurface

In one preferred embodiment, the undersurface of table 12 is cleaned of dust, dirt, wax, oil or (anything that may prevent excellent adhesive bonding). Next, a person installing the system (e.g. the customer buying the system) decides how many voters will be supplied with vote boxes 22 around conference table 12. Also, the person decides approximately where each vote box 22 will be located and temporarily adheres one wax board 120 (see FIG. 13) at each chosen location. Wax boards 120 are covered with wax (or other suitable non-stick coating)-on virtually all surfaces except one of the two large surfaces 122. In this preferred embodiment two of 3M®'S easily removable Command Strips™ 124 are adhered to large surface 122 of wax board 120. Command Strips™ 124 temporarily bond wax board 120 to the underside of table 12. Each wax board 120 is temporarily adhered by removing a release liner from the exposed surface of each of the Command Strips™ 124 and pressing the exposed adhesive against the undersurface of table 12 at the chosen location (in the preferred embodiment, a few inches in from the table's edge).

Figure 13:
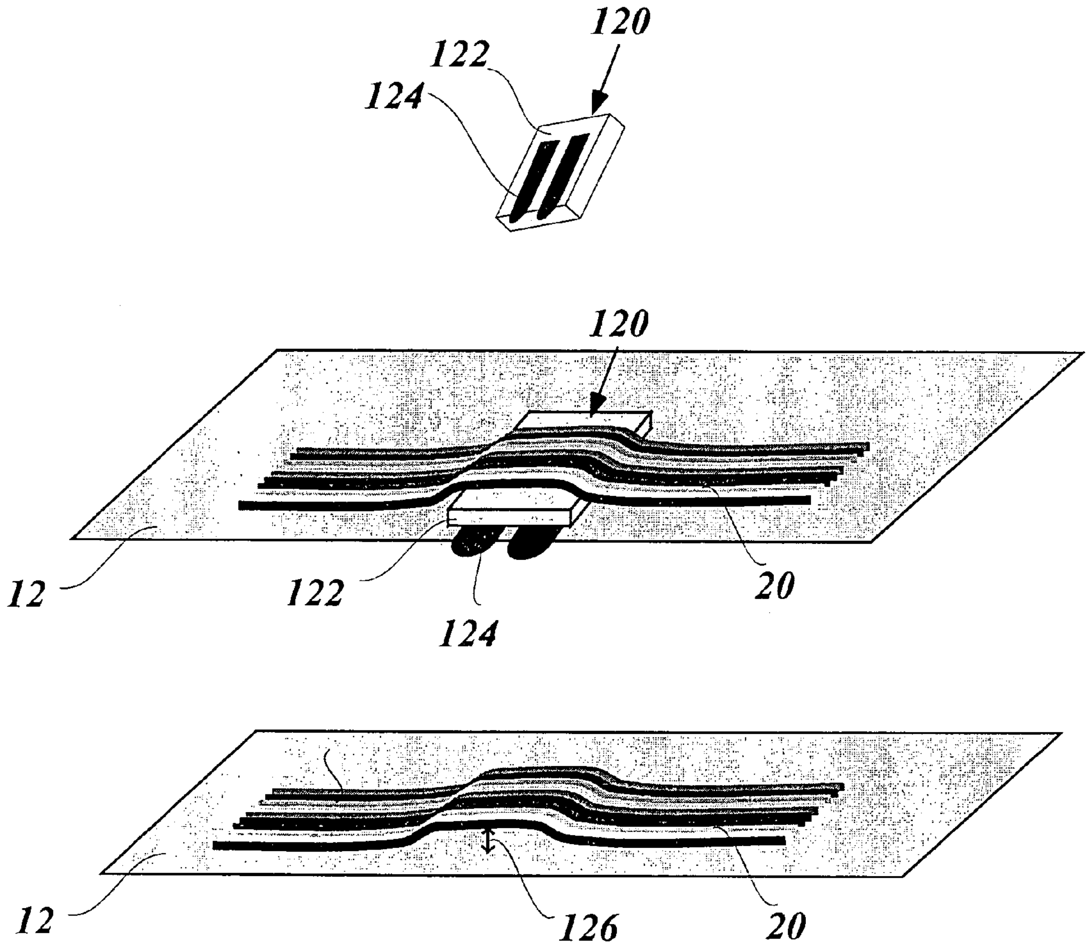
FIG. 13 is a perspective view illustrating a method of bonding self-adhesive ribbon cables to the undersurface of a table using wax board apparatus, in accordance with the present invention.

Referring specifically to FIG. 13, a mid installation step is illustrated. In this step only a short segment of self-adhesive ribbon cable 20 bonded to the undersurface of table 12 is illustrated for simplicity. Self-adhesive flat ribbon cable assembly 20 is rolled over wax boards 120 that are temporarily adhered to the undersurface of table 12 in order to reserve an air gap 126 for subsequent installation of connectors 115. After rolling on the full length of self-adhesive flat ribbon cable assembly 20, wax boards 120 are removed leaving air gaps 126. A receiving part 110 of a connector 115 is placed in each air gap 126 and a mating penetrating part 112 is installed, as explained above. Thus, all air gaps 126 are filled with connectors 115. It will be understood that a tool (e.g. a pair of parallel-jaw pliers with one narrow jaw) can be used to fit one (narrow) jaw into gap 126 and the other jaw below penetrating part 112, in order to press together connector 115.

The function of each wax board 120 is to reserve the small air gap 126 between adhesive backed flat ribbon cable assembly 20 and the undersurface of table 12. At locations where there are no wax boards 120, adhesive backed flat ribbon cable assembly 20 is fairly taut and securely bonded to the undersurface of table 12. If no wax boards 126 (or similarly operating device) were used, adhesive backed flat ribbon cable assembly 20 could become damaged [stretched and broken/weakened] when a connector 115 is applied to flat ribbon cable assembly 20. Note that each wax board 120 has a temporary adhesive surface 122 and a waxy (e.g. wax or silicone coated) opposite surface. The waxy surface will prevent undesired bonding between wax board 120 and the adhesive backing on flat ribbon cable assembly 20. In addition, each wax board 120 may support printed information (e.g. installation instructions like "Adhere this board where each vote button box will be."). It will be understood that while a specific embodiment of wax boards 120 is disclosed other embodiments can be constructed from various materials such as 'vinyl coated foam core boards' as used for Venetian blinds. These are smooth, light weight, low cost and have already rounded edges.

Once connectors 115 are in place, a vote box 22 is applied using, for example, the following steps. A vote box 22 is correctly oriented and lightly pressed to the undersurface of table 12 such that the chamfered opening 68 in the bottom of housing 65 and pins 72 in vote box 22 accurately align with the connector 115 that is attached to adhesive backed ribbon cable 20. Once this alignment is acceptable, vote box 22 is pressed more forcefully to the table. Finally, vote box 22 is pressed firmly against undersurface of table 12, in order to begin the 'permanent'-but-cleanly-removable bond. The bond should be undisturbed for about 24 hours (for the preferred kind of adhesive tape) before full strength is achieved. The previous steps are repeated to place and connect each of the remaining vote boxes 22.

Next adapter box 18 is positioned and attached to the undersurface of table 12. As explained above, the purpose of adapter box 18 is to adapt the wide and flat ribbon cable assembly 20 to the more flexible 'compact-round' cable 16. Note, although the flat ribbon cable is very orderly [neatly dressed] and highly durable when bonded to the table surface, it is not as durable, nor as orderly when not bonded. Therefore, a round cable, which flexes easily in all radial directions, is recommended for interface to information display console 15 and optional interface to a personal computer or the like.

Adapter-box 18 can be plugged in just as vote boxes 22 were. However, a different method for determining the 'correct orientation' of adapter-box 18 may be utilized. That is, adapter box 18 need not be near the table's edge. It may be located more toward the center of the table (e.g., near a cord-access-hole in table 12). Nevertheless, correct electrical interconnection, must be assured to avoid plugging adapter box 18 in backwards, and therefore rendering it nonfunctional. Correct orientation an be achieved by placing adapter box 18 such that a box label (not shown) is nearest the outermost edge of adhesive backed flat ribbon cable assembly 20. Here, the 'outermost edge' is the same edge of adhesive backed flat ribbon cable assembly 20 that runs closer to the perimeter of table 12 when near vote boxes 22. This edge may be easily identified by a red stripe (or other color) along its length.

Thus, by now it will be apparent that an easy-to-install do-it-yourself kit can be organized (using the components, methods and tools already described) containing all, or nearly all, of the parts and tools needed to install a table-based wired information system. Thus, for the first time ever, the innovative modular peel-and-stick component design and installation methodology enables ordinary office workers to perform the do-it-yourself installation in their own conference rooms. In turn, this enables low cost distribution and rapid market growth.

It should be understood that innovations disclosed herein can be more generally applied than explicitly stated. For example, it will be understood by those skilled in the art, that everywhere terms like "undersurface of a table" and 'table undersurface' are used one could substitute 'bench surface', 'counter surface', 'wall surface', 'ceiling surface', 'enclosure surface', 'vehicle interior surface', 'fence surface', 'floor surface' or the like. Also, the term "table" is intended to include any surface or device designed to have people congregate around for making decisions, playing games. etc. Further, the terms "vote" and "voting" are intended to include the operation of one of the vote boxes.

Thus an improved table-based wired information system has been disclosed which is easy to install and use and which is highly versatile. A system has been disclosed that is 'permanent'-but-cleanly-removable bonded to a table. It should be noted that the system is bonded sufficiently to deter theft, unlike other wireless or loosely affixed voting systems.

Various changes and modifications to the embodiments herein chosen for purposes of illustration will readily occur to those skilled in the art. For example, the specific cables can be modified by including more or less conductors and by using different adhesive materials. To the extent that such modifications and variations do not depart from the spirit of the invention, they are intended to be included within the scope thereof which is assessed only by a fair interpretation of the following claims.

What is claimed is:

1. A table-based wired information system comprising:

a table having a plurality of actual positions designed to receive people;

a monitor system, including a monitor positioned so as to be observed by people at any of the plurality of actual positions;

a plurality of vote boxes, one each affixed to an undersurface of the table at each of the plurality of actual positions, each vote box including a switch with at least two positions; and a flat ribbon cable assembly having first and second ends and a plurality of electrical conductors extending between the ends, the flat ribbon cable assembly being coupled to the monitor system and each of the vote boxes being coupled to the flat ribbon cable assembly intermediate the first and second ends.

2. A table-based wired information system as claimed in claim 1 wherein the monitor system is constructed with a plurality of available positions at least equal to the plurality of actual positions, and the plurality of available positions is greater than the plurality of electrical conductors in the flat ribbon cable assembly.

3. A table-based wired information system as claimed in claim 2 wherein the monitor system multiplexes information coupled between the flat ribbon cable assembly and the monitor system to allow the plurality of available positions to be greater than the plurality of electrical conductors.

4. A table-based wired information system as claimed in claim 1 wherein the switch included in each of the vote boxes includes a push button switch.

5. A table-based wired information system as claimed in claim 1 wherein the flat ribbon cable assembly includes an adhesive backing including a flat ribbon cable with double-sided adhesive tape adhesively affixed to one flat side.

6. A table-based wired information system as claimed in claim 5 wherein each of the vote boxes of the plurality of vote boxes is coupled to the flat ribbon cable by a press-on insulation displacement connector.

7. A table-based wired information system as claimed in claim 1 wherein the press-on insulation displacement connector is a two-part connector with a first part of the two-part press-on insulation displacement connector positioned on an under-surface of the table so as to be sandwiched between the under-surface of the table and the flat ribbon cable assembly and a second part of the two-part press-on insulation displacement connector includes electrically conductive blades extending through an insulation of the flat ribbon cable so as to make electrical contact with the electrical conductors therein.

8. A table-based wired information system as claimed in claim 7 wherein each of the vote boxes of the plurality of vote boxes is coupled to the flat ribbon cable by plugging into one of the two-part press-on insulation displacement connectors.

9. A table-based wired information system as claimed in claim 8 wherein each of the vote boxes of the plurality of vote boxes is constructed with spaced apart mounting flanges defining a flat mounting surface with a centrally located channel designed to allow clearance for the flat ribbon cable assembly and to receive the two-part press-on insulation displacement connector therein.

10. A table-based wired information system as claimed in claim 1 wherein the monitor system includes a microcomputer (MCU) programmed to tally votes registered by the plurality of vote boxes.

11. A table-based wired information system comprising:

a table having a plurality of actual positions designed to receive people;

a monitor system, including a monitor positioned so as to be observed by people at any of the plurality of actual positions;

a plurality of vote boxes, one each affixed at each of the plurality of actual positions, each vote box including a switch with at least two positions; and a flat ribbon cable assembly having first and second ends and a plurality of electrical conductors extending between the ends, the flat ribbon cable assembly being coupled to the monitor system and each of the vote boxes being coupled to the flat ribbon cable assembly intermediate the first and second ends, the flat ribbon cable assembly is coupled to the monitor system through an adapter box and a round flexible cable, one end of the round flexible cable being coupled to the flat ribbon cable assembly by the adapter box and to the monitor system at another end.

12. A table-based wired information system comprising:

a table having a plurality of actual positions designed to receive people;

a monitor system, including a monitor positioned so as to be observed by people at any of the plurality of actual positions, the monitor system being constructed with a plurality of available positions at least equal to the plurality of actual positions;

a flat ribbon cable assembly with adhesive backing, the flat ribbon cable assembly having first and second ends and a plurality of electrical conductors extending between the ends, the plurality of available positions being greater than the plurality of electrical conductors in the flat ribbon cable assembly, the flat ribbon cable assembly being coupled to the monitor system, and the flat ribbon cable assembly being affixed to an under-surface of the table in a flat orientation by the adhesive backing; and a plurality of vote boxes, one each positioned on the under-surface of the table at each of the plurality of actual positions, each vote box including a multi-position switch, and each of the vote boxes being coupled to the flat ribbon cable assembly intermediate the first and second ends by a press-on insulation displacement connector, each of the vote boxes of the plurality of vote boxes is constructed with spaced apart mounting flanges defining a flat mounting surface with a centrally located channel designed to allow clearance for the flat ribbon cable assembly and to receive the two-part press-on insulation displacement connector therein.

13. A table-based wired information system as claimed in claim 12 wherein the monitor system includes a microcomputer (MCU) programmed to tally votes registered by the plurality of vote boxes.

14. A table-based wired information system as claimed in claim 12 wherein the switch included in each of the vote boxes includes a push button switch.

15. A table-based wired information system as claimed in claim 12 wherein the flat ribbon cable assembly is coupled to the monitor system through an adapter box and a round flexible cable, the round flexible cable being coupled at one end to the flat ribbon cable assembly by the adapter box and to the monitor system at another end.

16. A table-based wired information system as claimed in claim 12 wherein the flat ribbon cable assembly includes an adhesive backing including a flat ribbon cable with double-sided adhesive tape adhesively affixed to one flat side.

17. A table-based wired information system as claimed in claim 12 wherein the insulation displacement connector includes two-parts, a first part of the two-part press-on insulation displacement connector is positioned on an under-surface of the table so as to be sandwiched between the under-surface of the table and the flat ribbon cable assembly and a second part of the two-part press-on insulation displacement connector includes electrically conductive blades extending through an insulation of the flat ribbon cable so as to make electrical contact with the electrical conductors therein.

18. A table-based wired information system as claimed in claim 12 where the multi-position switch in each of the vote boxes includes a FBLRU-type control.

19. A table-based wired information system as claimed in claim 12 including a PC coupled to the monitor system.

20. A table-based wired information system comprising:

a table having a plurality of actual positions designed to receive people;

a monitor system, including a monitor positioned so as to be observed by people at any of the plurality of actual positions, the monitor system being constructed with a plurality of available positions at least equal to the plurality of actual positions;

a flat ribbon cable assembly with adhesive backing, the flat ribbon cable assembly having first and second ends and a plurality of electrical conductors extending between the ends, the plurality of available positions being greater than the plurality of electrical conductors in the flat ribbon cable assembly, the flat ribbon cable assembly being coupled to the monitor system, and the flat ribbon cable assembly being affixed to an under-surface of the table in a flat orientation by the adhesive backing; and a plurality of vote boxes, one each positioned on the under-surface of the table at each of the plurality of actual positions, each vote box including a multi-position switch, and each of the vote boxes being coupled to the flat ribbon cable assembly intermediate the first and second ends by a press-on insulation displacement connector;

the monitor system further includes a microcomputer programmed for pre-discharging capacitance of the cable, prior to receiving information.

21. A table-based wired information system comprising:

a table having a plurality of actual positions designed to receive people;

a monitor system, including a monitor positioned so as to be observed by people at any of the plurality of actual positions, the monitor system being constructed with a plurality of available positions at least equal to the plurality of actual positions;

a flat ribbon cable assembly with adhesive backing, the flat ribbon cable assembly having first and second ends and a plurality of electrical conductors extending between the ends, the plurality of available positions being greater than the plurality of electrical conductors in the flat ribbon cable assembly, the flat ribbon cable assembly being coupled to the monitor system, and the flat ribbon cable assembly being affixed to an under-surface of the table in a flat orientation by the adhesive backing; and a plurality of vote boxes, one each positioned on the under-surface of the table at each of the plurality of actual positions, each vote box including a multi-position switch, and each of the vote boxes being coupled to the flat ribbon cable assembly intermediate the first and second ends by a press-on insulation displacement connector;

the monitor system further includes a microcomputer programmed to provide encryption checks to detect tampering.

22. A method of mounting a table-based wired information system on a table comprising the following steps performed in any convenient sequence:

providing a table having a plurality of actual positions designed to receive people, the table having an under-surface accessible at each of the plurality of actual positions;

providing a monitor system constructed with a plurality of available positions at least equal to the plurality of actual positions, the monitor system including a monitor;

positioning the monitor so as to be readable by people at any of the plurality of actual positions;

providing a flat ribbon cable assembly with adhesive backing, the flat ribbon cable assembly having first and second ends and a plurality of electrical conductors extending between the ends with the plurality of available positions being greater than the plurality of electrical conductors in the flat ribbon cable assembly;

adhesively affixing the flat ribbon cable assembly to the under-surface of the table in a flat orientation using the adhesive backing;

coupling the flat ribbon cable assembly to the monitor system;

providing a plurality of vote boxes, each vote box of the plurality of vote boxes including a multi-position switch; and adhesively attaching one each of the plurality of vote boxes to the under-surface of the table at each of the plurality of actual positions and coupling each of the vote boxes to the flat ribbon cable assembly intermediate the first and second ends by a press-on insulation displacement connector.

23. A method as claimed in claim 22 wherein the step of adhesively affixing the flat ribbon cable assembly to the under-surface of the table includes forming a gap between the flat ribbon cable assembly and the under-surface of the table at each of the plurality of actual positions.

24. A method as claimed in claim 23 wherein the step of coupling each of the vote boxes to the flat ribbon cable assembly with a press-on insulation displacement connector includes providing a two-part press-on insulation displacement connector, positioning a first part of the two-part press-on insulation displacement connector in the gap at each actual position, forcing electrically conductive blades of a second part of the two-part press-on insulation displacement connector through an insulation of the flat ribbon cable assembly so as to make electrical contact with the electrical conductors therein at each actual position, and plugging the one each of the plurality of vote boxes into one of the two-part press-on insulation displacement connectors.

25. A method as claimed in claim 24 where in the step of forcing electrically conductive blades through the insulation of the flat ribbon cable assembly, pressing the second part of the two-part press-on insulation displacement connector toward the first part of the two-part press-on insulation displacement connector, also forces out a substantial portion of the adhesive backing from between the first and second parts.

26. A method as claimed in claim 22 wherein the step of providing a flat ribbon cable assembly with adhesive backing includes the steps of providing a desired length of flat ribbon cable with a plurality of electrical conductors, providing a substantially equal length of double-backed adhesive tape, and pressing one adhesive side of the double-backed adhesive tape onto one flat side of the flat ribbon cable.

27. A method as claimed in claim 22 wherein substantially all of the parts and tools needed to install a table-based wired information system are organized as a do-it-yourself kit.

* * * * *